July 4, 1939.  J. D. LUTSCHG  2,164,462
ROTARY INTERNAL COMBUSTION ENGINE
Filed Aug. 9, 1937   3 Sheets-Sheet 1
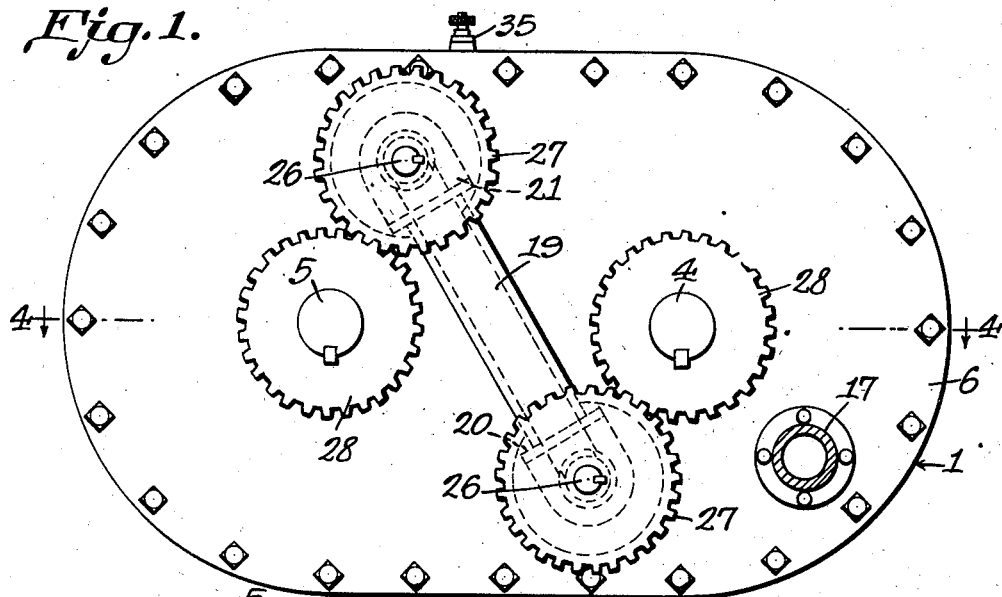
Fig. 1.
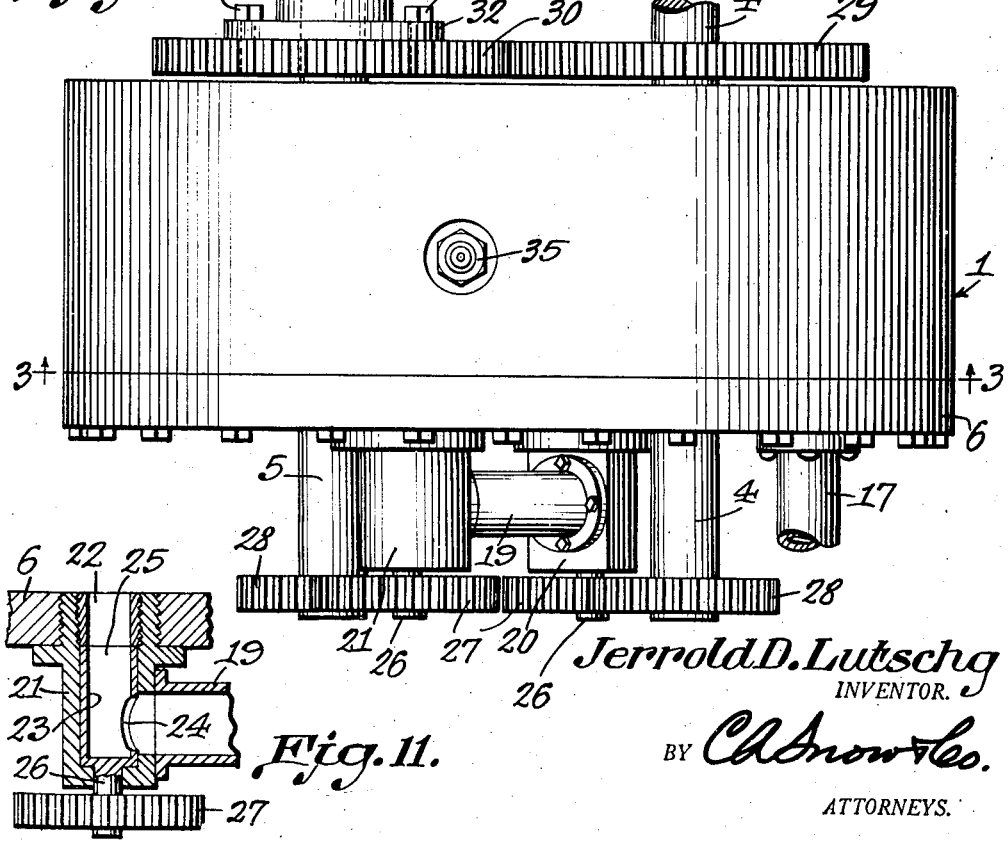
Fig. 2.
Fig. 11.
Jerrold D. Lutschg
INVENTOR.
BY C. A. Snow & Co.
ATTORNEYS.

Jerrold D. Lutschg
INVENTOR.

BY *CASnow &Co.*
ATTORNEYS.

July 4, 1939.  J. D. LUTSCHG  2,164,462

ROTARY INTERNAL COMBUSTION ENGINE

Filed Aug. 9, 1937   3 Sheets-Sheet 3

Jerrold D. Lutschg
INVENTOR.

BY *C. A. Snow & Co.*

ATTORNEYS.

Patented July 4, 1939

2,164,462

UNITED STATES PATENT OFFICE 2,164,462

ROTARY INTERNAL COMBUSTION ENGINE

Jerrold D. Lutschg, Inglewood, Calif.

Application August 9, 1937, Serial No. 158,067

5 Claims. (Cl. 123—12)

This invention relates to internal combustion engines of the rotary type, an object being to provide an engine unit made up of a pair of rotary pistons in constant contact at their peripheries except for a momentary period for the release of excess compressed gases, the said pistons being peculiarly shaped so that, during their simultaneous rotation in opposite directions respectively, they will cooperate to form a chamber in which a partial vacuum first will be produced for the intake of fuel mixture after which the fuel mixture will be compressed and delivered to a combustion chamber where the explosion will result in the actuation of one of the pistons while the other piston constitutes an abutment, suitable means being provided whereby motion will be transmitted from one piston to the other.

A further object is to provide means whereby the compressed fuel mixture left within the compression chamber at the completion of the compressing operation, will be released into the vacuum chamber so as to subsequently be mixed with a new charge of fuel mixture.

Another object is to provide an engine of this character formed of few parts, which is compact in construction, efficient in operation, and the rotary pistons of which can be readily adjusted to insure absolute matching of the peripheries thereof during their operation.

A still further object is to provide an arrangement of fuel mixture control valves constantly actuated in proper time relation to the operation of the pistons.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is an elevation of one side of the engine and showing the gearing used for actuating the valves.

Figure 2 is a plan view of the engine.

Figure 11 is an enlarged section through one of the valves.

Figure 3:
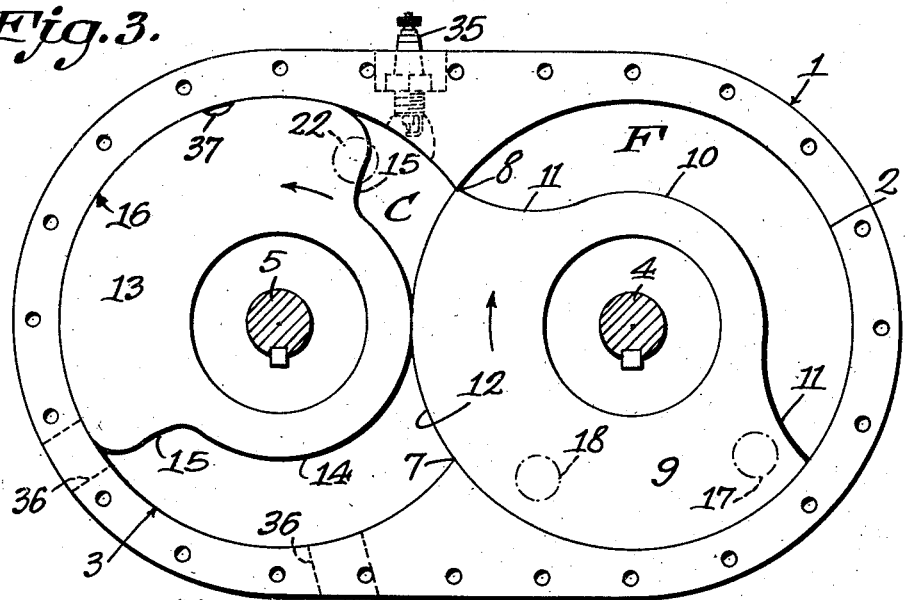
Figure 3 is a section on line 3—3, Figure 2.

Referring to the figures by characters of reference 1 designates the engine block in which are formed a pair of recesses 2 and 3 the walls of which are concentric with shafts 4 and 5 which are journalled in the block and in the head 6 closing one face thereof. The walls of the two recesses 2 and 3 come together at opposed points as shown at 7 and 8, this being due to the fact that the distance between the axes of the two shafts 4 and 5 is less than the diameter of either recess.

In the structure illustrated the recesses 2 and 3 are of the same size and in the recess 2 there is rotatably mounted a piston 9 the periphery of which, for one-half its circumference, is concentric with shaft 4 so as to have a tight wiping contact with the wall of recess 2 while the remaining half of the periphery is cut away along curved lines to provide an intermediate concentric portion 10 and outwardly curved end portions 11 which terminate in abrupt angles at the ends of the outer concentric portions 12 of the periphery. This piston is fixedly secured to the shaft 4 so as to rotate therewith and constitutes the fuel mixture feeding piston.

The power piston has been indicated at 13 and is secured to shaft 5 so as to rotate therewith. This power piston has one-half of its periphery concentric with the shaft 5 and positioned at such a distance from its axis of rotation as to have a contact with the outer peripheral portion 12 of the fuel mixture feeding piston 9. This inner concentric portion 14 of piston 13 terminates at its ends, which are diametrically opposed, at the inner ends of outcurved portions 15 which merge into the outer concentric portion 16 of the periphery which is designed to have a tight wiping contact with the wall of recess 3 and also a contact with the inner concentric portion 10 and curved portions 11 of fuel mixture feeding piston 9.

A fuel intake port 17 opens into the lower portion of the recess 2 at one side of the vertical center thereof while a fuel mixture outlet port 18 communicates with the lower portion of recess 2 at the other side of the vertical center thereof. This latter port opens into one end of a by-pass 19 which, as shown particularly in Figures 1 and 2, is provided at its lower end, with a valve casing 20 and at its upper end with another valve casing 21, this latter casing being provided with a fuel mixture outlet port 22 which opens into the upper portion of the recess 3 between the point 8 and the vertical center of the recess. A rotary valve 23 is mounted within the valve casing 21, this valve being tubular and provided with a side port which intermittently registers with by-pass 19 during the rotation of the valve. An end port 25 is provided in the valve which is in constant communication with the port 22.

Another valve 23' like the one already described and which has been shown in Figure 11, is provided in the valve casing 20 and both of the valves are provided with stub shafts 26 to which are secured gears 27. These gears receive motion from gears 28 secured to the respective shafts 4 and 5.

Figure 12:
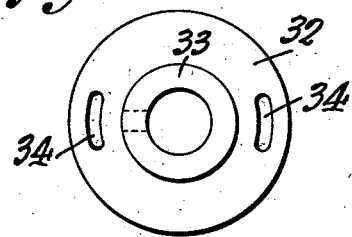
Figure 12 is an elevation of a portion of the piston adjusting means.

A gear 29 is secured to shaft 4 and meshes with another gear 30 of the same diameter. This latter gear is mounted on shaft 5 but is not secured directly to it. Instead it is clamped, by means of bolts 31 or the like to a flange 32 extending around a collar 33 fixedly secured to shaft 5. The bolts 31 extend through short slots 34 (see Figure 12) so that it is thus possible to adjust gear 30 angularly relative to the collar 33 and shaft 5. Thus relative angular adjustment of the two pistons 9 and 13 can be effected to insure proper matching of the peripheries of the pistons during their relative rotation. A suitable ignition device, such as a spark-plug 35 is provided in the block 1 at a point where it can ignite the compressed charge when ready for firing. This spark-plug is located between port 22 and the point 8, and the sparking action can be effected by any well known means and in proper time relation to the rotation of the pistons.

Figure 9:
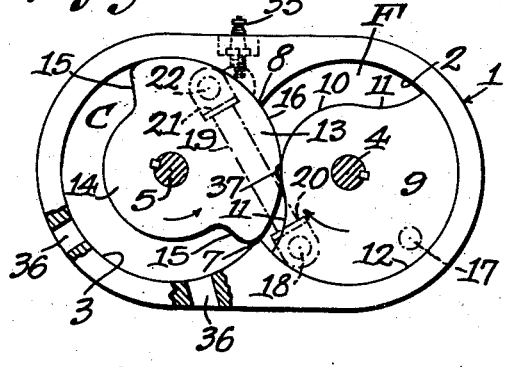
Figure 9 is a similar view showing the relative positions of the pistons following the completion of the fuel mixture compressing operation and showing the clearance located to release excess compressed fuel mixture into the partial vacuum within the advancing portion of the fuel mixture chamber.
Figure 10:
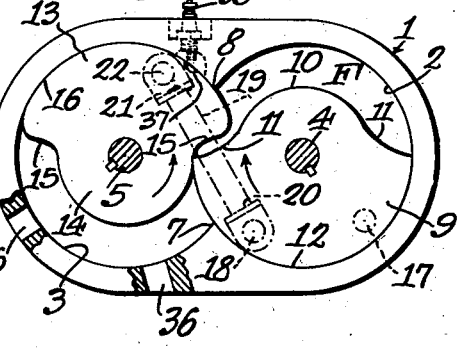
Figure 10 shows the relative positions of the pistons during the completion of the creation of a partial vacuum in the fuel mixture chamber, and immediately prior to the pistons assuming the positions shown in Figure 3 when the compressed charge is fired.

Let it be assumed that the pistons are rotating in the directions indicated by the arrows in Figures 5 to 10 and that they have reached the positions shown in Figure 10. At this time a charge of fuel under compression is contained within the by-pass 19 while the rotation of piston 9 has created a partial vacuum in the fuel mixture chamber F.

Figure 5:
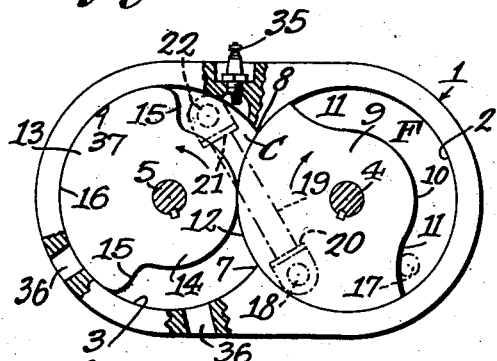
Figure 5 is a view similar to Figure 3 but on a reduced scale, showing the relative positions of the pistons immediately following the explosion of the gas in the combustion chamber.
Figure 6:
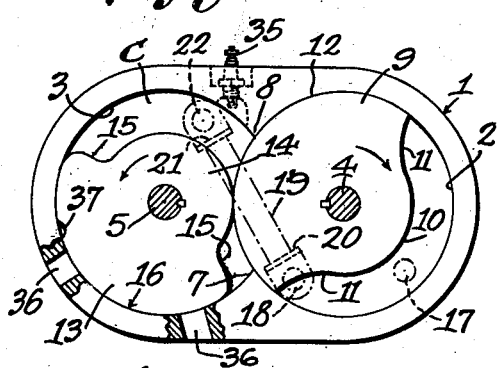
Figure 6 is a similar view showing the pistons moved under the force exerted by the expanding gases and at the same time admitting a charge of fuel mixture to the fuel chamber.
Figure 7:
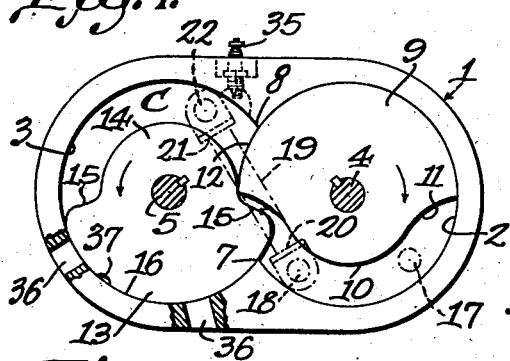
Figure 7 is a similar view showing the relative positions of the pistons during the beginning of the fuel mixture compressing operation.
Figure 8:
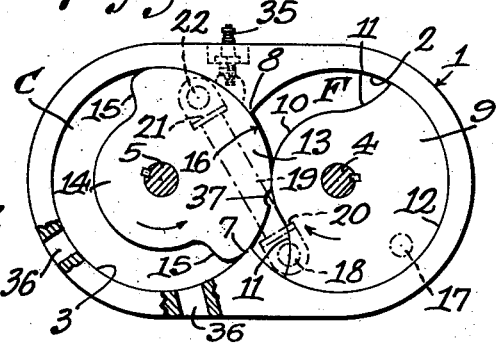
Figure 8 shows the relative positions of the pistons during the exhaust operation and at the completion of the fuel mixture compressing operation.

Immediately following the compression of gases in the by-pass, piston 13 moves to position to uncover port 22 as in Figure 5 and simultaneously the compressed gases in the by-pass are released into the combustion chamber C. Immediately thereafter the valve 23 in casing 21 closes, shutting off communication between combustion chamber C and the by-pass and, following this closing action, the charge is exploded so as to impel the piston 13 past the position shown in Figure 5, the shoulder 15 of the piston forming the wall of the explosive chamber constituting means for receiving the force of the explosion while the peripheral portion 12 of piston 9 constitutes an abutment.

During the movement just described, the fuel mixture chamber F has gradually been increased in size due to the relative rotation of the piston and this has created an increasing partial vacuum in said chamber which remains until the advancing shoulder 11 of piston 9 uncovers the intake port 17 as in Figure 5, at which time a fresh supply of fuel mixture rushes into chamber F as will be noted by referring to Figure 5. As the expanding fuel mixture in chamber C forces piston 13 to rotate in a counter-clockwise direction successively to the positions shown in Figures 6 and 7, the combustion chamber C ultimately is brought into communication with one of the exhaust ports 36 located in the lower portion of the wall of recess 3 and the advancing shoulder 11 of piston 9 ultimately uncovers port 18. At this time the advancing shoulder portion 11 makes contact with the corresponding shoulder portion 15 of piston 13, as shown in Figure 9 and as the pistons continue to revolve the following shoulder 11 of piston 9 ultimately closes port 17 and then proceeds to compress the charge of gas contained between said shoulder and the peripheral portion 16 of piston 13. During this compressing action the valve in casing 20 has opened automatically to allow the compressed gas to enter and be held under compression within the by-pass 19. These relative positions are shown in Figure 10 and it will be noted, at the same time, that port 22 is closed by piston 13. The valve in casing 20 now closes while the valve in casing 21 opens and as the following shoulder portion 11 of piston 9 crosses port 18 the small amount of compressed fuel mixture left between said shoulder portion and the peripheral portion 16 can vent or escape between the two pistons through a shallow clearance 37 in piston 13, as shown in Figure 9 so as thus to flow into the partial vacuum being created in the fuel mixture chamber F. The pistons now continue to rotate in contact with each other, as shown in Figure 10, thereby creating the vacuum fuel mixture chamber F until the pistons reach the positions shown in Figure 3 and then the positions shown in Figure 5 whereupon the cycle of operation already described is repeated.

Figure 4:
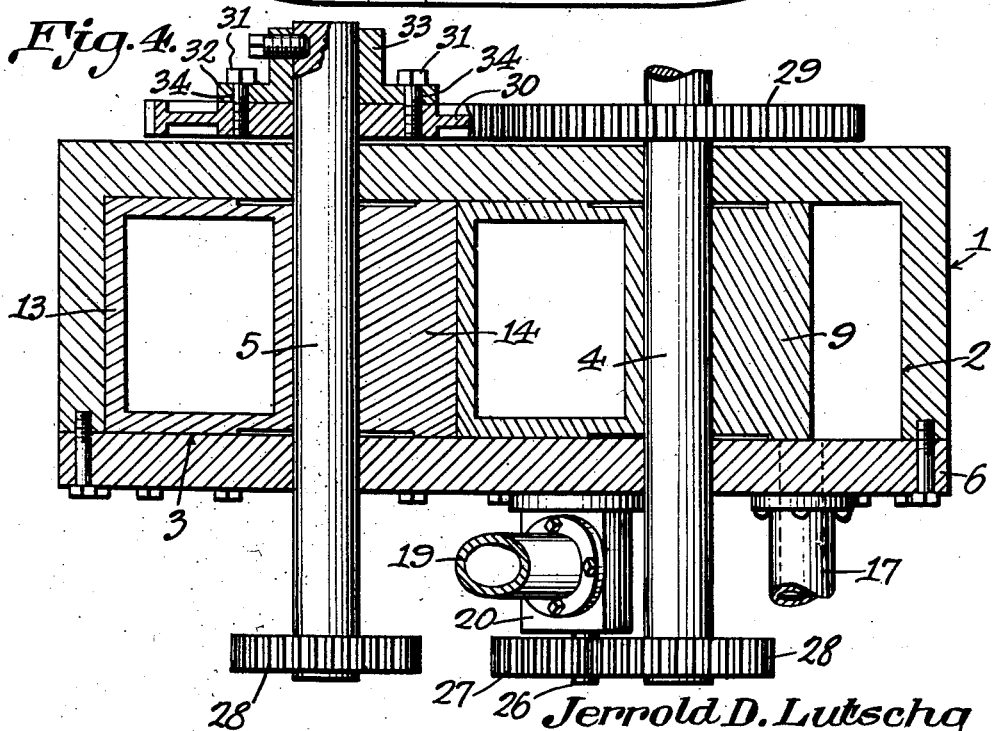
Figure 4 is a section on line 4—4, Figure 1.

The term "solid" used in the claims to describe the pistons is not to be construed as indicating that the pistons are necessarily formed each in a solid block of metal. On the contrary this term is employed to indicate that the working faces of each piston are solid or imperforate so that gases cannot flow through the piston. See Figure 4.

It is to be understood that, instead of providing pistons of the same maximum radii, one piston could be made smaller than the other but operated at such speed as to properly cooperate with the larger piston to effect the successive operations heretofore explained. Also instead of providing an engine formed solely of two pistons, as shown, it can be made up of a number of units each comprising two pistons.

What is claimed is:

1. The combination with an engine block having communicating substantially cylindrical chambers therein, of solid rotary pistons within the respective chambers and in substantially constant contact, each piston having an inner peripheral portion and an outer peripheral portion, the inner peripheral portion of each piston cooperating with the outer peripheral portion of the opposed piston, the inner peripheral portion of one of the pistons cooperating with the wall of its chamber to form a combustion chamber having a fuel mixture inlet, there being an exhaust port for communication with said combustion chamber when the piston therein is moved a predetermined distance following the combustion of a charge of fuel mixture, the inner periphery of the other piston cooperating with the wall of its chamber to create a suction and provide a fuel mixture intake chamber, there being a fuel mixture inlet and outlet adapted to communicate with said fuel mixture chamber, one of the walls of said piston cooperating with the outer periphery of the opposed piston to place fuel mixture under compression within the fuel mixture chamber once only during each complete rotation of the pistons, a by-pass leading from the fuel mixture outlet of the fuel mixture chamber to the fuel mixture inlet of the combustion chamber and positioned to receive fuel mixture under compression, a valve at each of the ends of the by-pass, and means under control of the rotating pistons for opening and closing the by-pass at predetermined times in relation to the rotation of the pistons.

2. An internal combustion engine including a block having communicating chambers therein, one of said chambers having a fuel mixture inlet and an exhaust port and the other chamber having a fuel mixture inlet and a fuel mixture outlet, a by-pass connecting said fuel mixture outlet to the fuel mixture inlet of the other chamber, a valve at each of the ends of the by-pass for controlling communication between the by-pass and the respective chambers, a solid power piston mounted for rotation in one of the chambers having an inner peripheral portion concentric with its axis of rotation and an opposed outer peripheral portion concentric with said axis, said portions being joined by outwardly curved shoulders constituting vanes, a solid fuel mixture feeding piston mounted for rotation in the other chamber and having an inner peripheral portion concentric with its axis of rotation and merging at its ends along curved shoulders into an outer peripheral portion concentric with the axis of rotation, the two pistons being in substantially constant contact, the inner peripheral portion of each piston cooperating with the outer peripheral portion of the opposed piston thereby to maintain a tight fit between the pistons at substantially all times during the rotation thereof in opposite directions respectively, the inner peripheral portion of the fuel mixture feeding piston cooperating with the wall of its chamber to form a fuel mixture chamber adapted successively to communicate with the fuel mixture inlet and the fuel mixture outlet of said chamber and to successively close the fuel mixture inlet and fuel mixture outlet, and the power piston cooperating with the walls of its chamber and with the fuel mixture feeding piston to form a combustion chamber for successive communication with the fuel mixture inlet and the exhaust ports of said chamber, one of the shoulders of the fuel mixture feeding piston cooperating with the walls of its chamber and with the power piston to place the fuel mixture in the fuel mixture chamber under compression once only during each rotation of the pistons and to force it under pressure into the by-pass, there being a clearance in one of the pistons and cooperating with the opposed piston for the escape of excess compressed fuel mixture from the fuel mixture containing chamber between and past the piston during the final portion of the compressive action of the pistons into that portion of said chamber moving into position to receive a new charge of fuel mixture.

3. An internal combustion engine including a block having communicating substantially cylindrical compartments, an intake port and an exhaust port communicating with one compartment, an intake port and an outlet port communicating with the other compartment, a solid power piston and a solid fuel mixture controlling piston mounted for rotation within the respective compartments and cooperating with the walls thereof to provide a combustion chamber for successive communication with the joist named fuel mixture intake port and the exhaust port and a fuel mixture receiving chamber for successive communication with an intake port and the second mentioned outlet port, a by-pass connecting the outlet of the fuel mixture feeding chamber to the inlet port of the combustion chamber, means for transmitting motion from one of the pistons to the other, said pistons having interfitting peripheral portions arranged for substantially constant contact, the fuel mixture controlling pistons constituting means, during its rotation, for closing the fuel mixture intake to said piston and opening the fuel mixture outlet and for cooperating with the power piston to place the fuel mixture under compression and force it into the by-pass once only during each complete rotation of the pistons, there being a clearance between the pistons for the passage of excess compressed fuel mixture at the completion of the fuel mixture compressing operation from one end portion of the fuel mixture receiving chamber to the opposed end portion thereof, a valve at each of the respective ends of the by-pass, and means controlled by the rotation of the pistons for opening and closing the valves in properly timed relation with the pistons thereby to admit fuel mixture under compression to the combustion chamber and close communication between the by-pass and the combustion chamber immediately prior to the ignition of the charge in the combustion chamber, and means for igniting the charge.

4. In an internal combustion engine the combination with an engine block having communicating chambers therein, and separate solid pistons mounted for rotation within the respective chambers, each piston having an inner periphery and an outer periphery concentric with its axis of rotation, the said pistons being in substantially constant contact to form a combustion chamber in one of the compartments and a fuel mixture receiving and compressing chamber in the other compartment, means for transmitting motion from one of the pistons to the other whereby said pistons will rotate simultaneously to draw a charge into the fuel mixture compartment, compress the charge against the power piston, and deliver the compressed charge to the combustion chamber once only during each complete rotation, a by-pass constituting means for receiving the compressed charge from the fuel chamber and conducting it to the combustion chamber during the completion of said rotation, a valve at each of the ends of the by-pass, and means operated by the pistons for opening and closing the valves in proper time relation to the rotation of the pistons.

5. An internal combustion engine including a block having communicating compartments, one of said compartments having a fuel mixture intake and a fuel mixture outlet and the other compartment having a fuel mixture intake and an exhaust, a by-pass connecting said fuel mixture outlet of the first named chamber of the first named compartment and the fuel mixture intake of the other compartment, solid pistons mounted for rotation within the respective compartments and each having an inner and an outer periphery concentric with its axis of rotation, the inner periphery of one piston cooperating with the wall of the compartment to form a fuel mixture receiving chamber for successively receiving fuel mixture and compressing it once only during each complete rotation of the pistons, and the inner periphery of the other piston cooperating with the wall of its chamber to provide a combustion chamber for successively receiving fuel mixture under compression and exhausting the burned fuel mixture, angularly adjustable means for transmitting motion from one piston to the other, said pistons being rotatable in opposite directions simultaneously and having substantially constant contact at their peripheries, said pistons constituting means for opening and closing the respective ends of the by-pass in properly timed relation, means for firing a compressed charge in the combustion chamber, and means for venting said compressed fuel mixture between the pistons from one end portion of the fuel mixture chamber to the opposed end portion thereof following complete compression of the fuel mixture at the completion of each rotation of the piston.

JERROLD D. LUTSCHG.